Figures 1, 2:
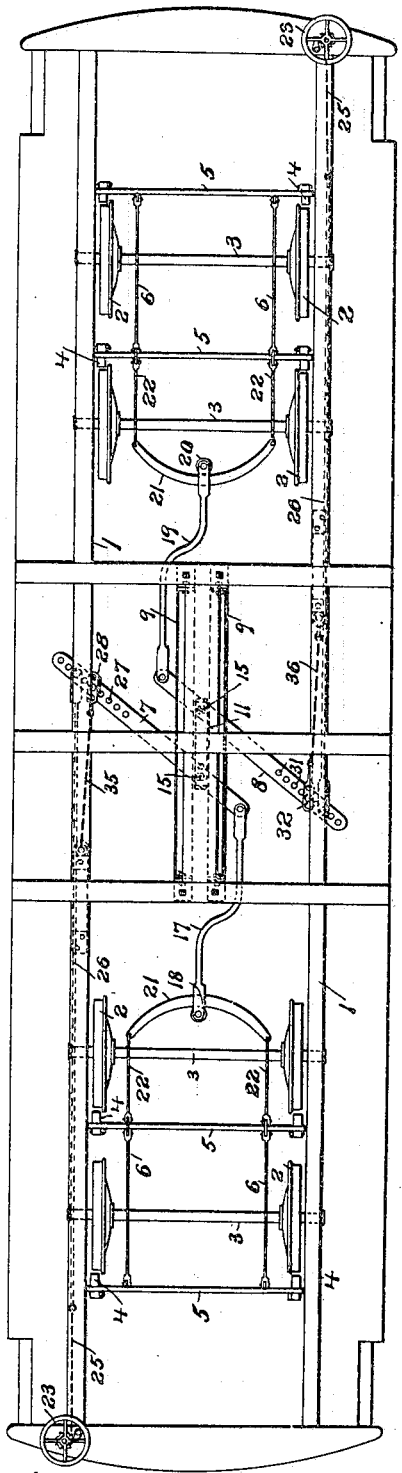

No. 769,480. PATENTED SEPT. 6, 1904.
J. D. KEILEY.
BRAKE.
APPLICATION FILED FEB. 21, 1902.
NO MODEL. 2 SHEETS—SHEET 1.

Attest:
J. A. Graves.
Geo. H. Botts.

Inventor:
John D. Keiley
by Philipp, Sawyer, Rice & Kennedy
Attys.

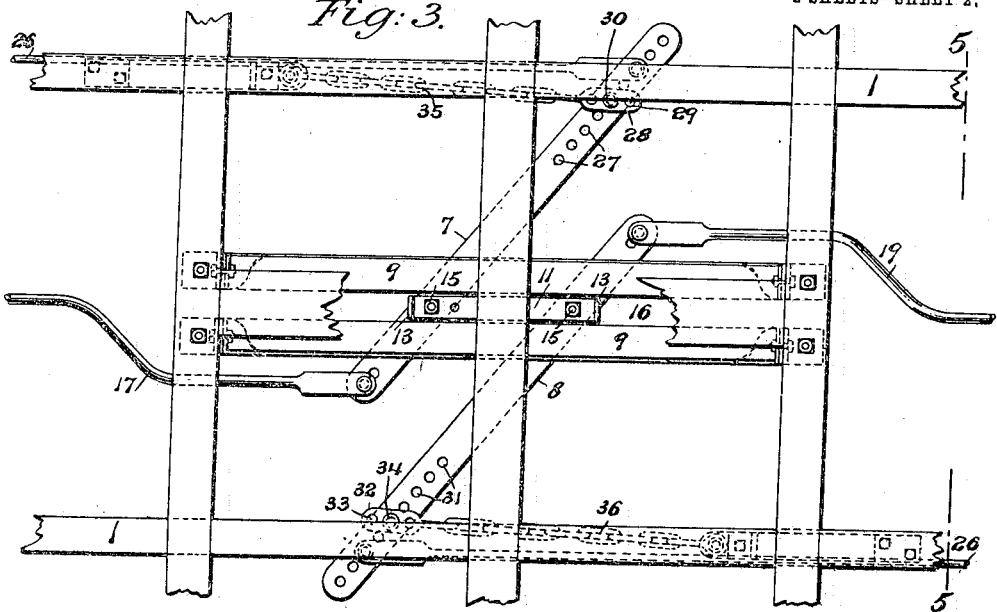
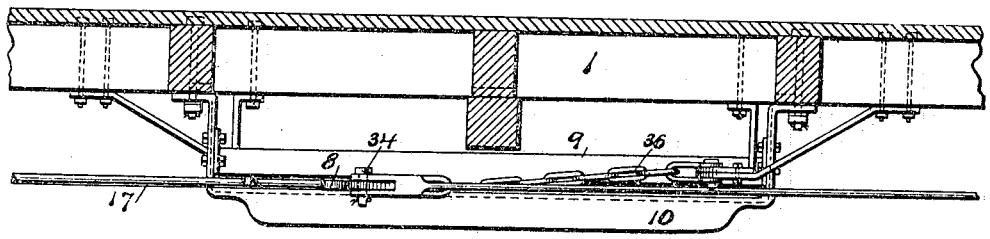
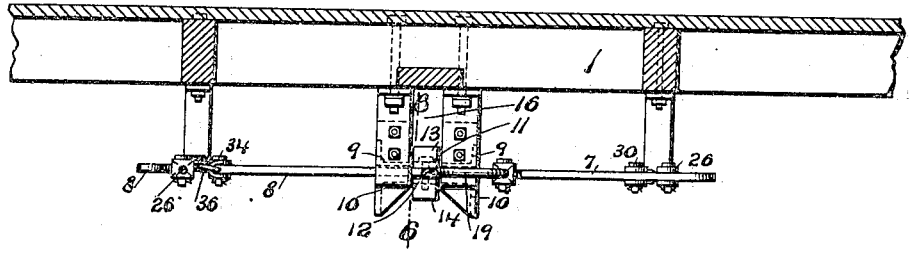
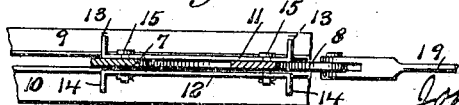

No. 769,480. Patented September 6, 1904.

UNITED STATES PATENT OFFICE.

JOHN D. KEILEY, OF NEW YORK, N. Y.

BRAKE.

SPECIFICATION forming part of Letters Patent No. 769,480, dated September 6, 1904.

Application filed February 21, 1902. Serial No. 95,025. (No model.)

*To all whom it may concern:*

Be it known that I, JOHN D. KEILEY, a citizen of the United States, residing at New York, county of Kings, and State of New York, have invented certain new and useful Improvements in Brakes, fully described and represented in the following specification and the accompanying drawings, forming a part of the same.

This invention relates to certain improvements in vehicle-brakes.

The brakes for vehicles which have wheels or sets of wheels at each end—such, for instance, as the ordinary tram-car—are usually arranged so that the pressure produced on the brake-shoes by the brake-applying means, which is ordinarily termed the "braking" pressure, is equally divided between the shoes at each end. When, however, the brakes are applied to such a vehicle, there is a tendency for the rear end of the vehicle to rise from the road or track, thus decreasing the weight on the rear wheels or truck, and consequently increasing the weight on the front wheels or truck. The maximum braking effect should, however, be the result of such an application of braking pressure as will produce the greatest possible resistance between the wheels and the road or track without causing the wheels to slide or skid thereon. It follows, therefore, that when the pressure produced on the brake-shoes by the brake-applying means is equally distributed between the shoes at each end of the car the maximum braking possibilities are not utilized, because the tendency of the vehicle to tilt forward makes it possible to apply a greater pressure to the wheels at the leading end of the vehicle without having them slide or skid than can be applied to the rear wheels without causing them to slide or skid. The resistance between the wheels and the road or track is technically known as the "braking effort," and if the full braking possibilities are to be realized the pressure produced on the wheels of leading truck should be such as to produce a greater braking effort with respect to these wheels than is produced with respect to the wheels at the rear end of the vehicle.

It has been heretofore proposed in certain types of motor-cars to apply a greater braking pressure to the wheels at that end of the car which carries the motor than at the other end of the car, for the reason that the weight of the motor places a greater pressure on these wheels than is sustained by the wheels at the other end of the car and for the further reason that the revolving parts of the motor have a considerable inertia which must be overcome by the brake-shoes in stopping the wheels which are connected to the motor. In such cars, however, although it has been customary to apply a greater pressure to the motor-carrying wheels or truck than to the other wheels or truck, this pressure has heretofore always been so calculated that the braking effort produced at the motor end of the vehicle is substantially equal to the braking effort produced at the other end, so that the maximum braking possibilities are not utilized. A construction has also been suggested by which the braking pressure which was applied to the wheels of the leading truck of a motor-car would be greater than the pressure applied to the other wheels. The proposed construction, however, is of such a character that the difference in braking pressure between the wheels of the leading and rear trucks was not in a fixed ratio. In this construction, therefore, it is not possible to maintain the proper difference in pressure between the wheels of the two trucks, nor is it possible to adjust the difference in pressure as may be required by changes in the service. Finally, the suggested construction is complicated and expensive and has not, therefore, gone into practical use extensively, if at all.

It is the object of this invention to produce a braking apparatus for vehicles having wheels at each end in which the braking effort due to the application of the brake-shoes to the wheels shall always be greater at the leading end of the vehicle and the difference in braking effort shall be in a fixed ratio, whereby the maximum braking possibilities at that end of the vehicle may be utilized.

With this and other objects in view the invention consists in certain constructions and in certain parts, improvements, and combinations, as will be hereinafter fully described and then specifically pointed out in the claims hereunto appended.

In the accompanying drawings, in which like characters of reference indicate the same parts, Figure 1 is a diagrammatic view representing in plan the underframe of a tramcar having one form of the improved brake-applying device applied thereto. Fig. 2 is a side elevation of the construction shown in Fig. 1. Fig. 3 is an enlarged plan view illustrating more particularly the floating levers employed and their connections. Fig. 4 is a side elevation of the lever mechanism shown in Fig. 3, the frame of the car being shown in section. Fig. 5 is a section on the line 5 5 of Fig. 3. Fig. 6 is a section on the line 6 6 of Fig. 5.

The vehicle which has been selected to illustrate the preferred embodiment of the invention is a tram-car of ordinary type, the underframe of the car being marked 1. The car is provided with the usual wheels 2, said wheels being located at each end of the vehicle and being mounted on axles 3, the trucks in which the axles are mounted being omitted for clearness in illustration. The wheels at each end of the car have brakes coöperating therewith, which brakes may be of any desired construction. As shown, they consist of the usual shoes 4. Inasmuch as there are two sets of wheels at each end of the car, there are two sets of shoes 4 at each end thereof, the shoes being arranged in pairs and each pair being carried by the usual brake-beam 5. These brake-beams 5 are connected for joint operation by links 6. The means by which the brakes are thrown into operative relation with the wheels may be varied widely in construction. These means will, however, in any form be so constructed as to apply the brakes so that a greater "braking effort," which, as has been before said, is the technical term denoting the resistance between the wheels and the track or road, is produced at one end of the car than at the other end, and when, as in the form of vehicle illustrated, the vehicle or car is adapted to move in either direction these means will be so constructed that the greater braking effort is produced at the leading end of the car. In the preferred form of the invention the means for throwing the brakes into operative relation with the wheels will include a lever system which may be varied widely both as to the number of levers employed and as to the arrangement of such lever or levers. In the particular construction illustrated the lever system embodies two floating levers, said levers being marked, respectively, 7 and 8. These levers 7 and 8 are supported between two pairs of strips formed by angle-bars, the upper strip of each pair being marked 9 and the lower strip 10. The strips 9 and 10 of each pair are spaced apart, and the levers are located between them. A suitable connection is employed between the two levers. In the construction shown this connection is formed by a pair of strips 11 and 12, the strip 11 having angular ends 13 and the strip 12 having angular ends 14. These strips are secured to the levers by pins 15, which pivot the strips to the levers, each pin passing through one lever and both of the strips. The strips thus form a link connection between the levers, each lever being pivoted to the link. In the preferred form of the construction the link will be guided in its movement, and while the construction by which it is guided may be of any suitable form, as shown, each pair of strips 9 and 10 is spaced apart, so as to form a way 16, in which the link moves, the space between each pair of strips 9 and 10 being such as to permit the levers to have a free movement. Should, however, the strips 9 and 10 become spread, the angular ends 13 and 14 of the parts which form the connecting-link between the levers will prevent the levers from moving sidewise and the link from entering the space between the strips, and thereby causing breakage or jam. The connection by which the levers operate the brakes may be of any suitable form. As shown, the inner end of the lever 7 has connected to it a rod 17, which has on its end a traveler 18. Similarly, the lever 8 has connected to it a rod 19, which has on its end a traveler 20, these travelers 18 and 20 running on the usual circular bars 21, which are connected, by means of links 22, to each pair of brake-beams 5. While the connections which have been illustrated and described by which the levers 7 and 8 serve to throw the brake-shoes into operative relation with the wheels are a convenient means for effecting this result, no novelty is claimed for them, and it is to be understood that any other suitable means may be substituted for them. The means for operating the lever system may be varied widely and will vary in accordance with the particular kind of lever system which is used. Preferably, however, these means will include a brake-applying device, which is located at each end of the vehicle. In the construction shown the brake-applying devices consist of ordinary hand-wheels 23, these wheels being mounted on standing shafts 24, which are connected, through chains 25 and rods 26, to the outer ends of the levers.

With the construction as so far described it will be seen that when either hand-wheel is operated the brakes on the wheels at each end of the vehicle will be operated. Thus, for instance, when the hand-wheel which is directly connected with the lever 8 is operated this lever will be moved to apply the brake-shoes with which it is connected through its rod 19 and the parts moved thereby, and the lever 7 will be operated through the link which connects the two levers, and it will in turn operate the brake-shoes to which it is connected through its rod 18 and the parts moved thereby. With the construction as so far described, however, the pressure with which the brakes are applied to the wheels will be substantially equal whichever hand-wheel is operated. In order to produce a greater braking effort at one end of the vehicle than is produced at the other, it is necessary where a lever system is employed to change the leverage by which the system operates to apply the brakes to the wheels. The means employed for changing the leverage may vary widely in construction and will vary according to the number of levers employed and to the arrangement of the lever or levers which constitute the system. In the specific construction which has been chosen to illustrate the invention each of the levers is provided with a dead-point; but these dead-points are so arranged as to be inoperative except under certain circumstances. The means by which the levers are provided with the dead-points referred to may be varied within wide limits. Preferably, however, each lever will be provided with a stop which will be operated only when the lever is operated through the link or through the connection which connects the levers, said stop being inoperative when the lever with which it coöperates is operated by the brake-applying device which is connected thereto. The stops employed may be varied widely in construction. They will, however, preferably be adjustable, so that by varying their position with respect to the levers with which they coöperate the differences in pressure may be varied. As shown, the lever 7 is provided with a series of holes 27 and carries a clevis 28, the clevis being provided with a plurality of holes 29 and being secured to the lever 7 by means of a pin 30. Similarly, the lever 8 is provided with a series of holes 31 and has coöperating with it a clevis 32, said clevis having a series of holes 33 for the purpose of adjustment and being secured to the lever by means of a pin 34. The clevis 28 is flexibly connected to the frame of the car or vehicle by means of a chain 35, and the clevis 32 is similarly connected to the frame of the car by means of a chain 36. With this construction it will be seen that when the brake-applying device which is connected to the lever 7 is operated the lever 7 will first move bodily in the direction in which it is pulled by the brake-applying device and will cause the lever 8 to move in the same direction until chain 36 has been pulled taut. As soon as the chain 36 becomes taut the clevis and pin connected therewith form a fulcrum for the lever 8 and a dead-point for the entire system, the other fulcra for the system being shifting fulcra. The further movement of the lever 7, produced by the brake-applying device, causes this lever to apply its brakes through the rod 17 and the parts connected therewith and causes the lever 8 to apply its brakes through the rod 19 and the parts connected therewith. The power-arm of the lever 7 is, however, longer than the power-arm of the lever 8. It follows, therefore, that the brakes which are connected with this lever will be applied with greater pressure than the brakes which are applied by the lever 8. If, however, the brake-applying device which is connected with the lever 8 be operated, the lever 8 will first move bodily in the direction in which it is pulled by its brake-applying device and through the link connection between the levers will move the lever 7 until the chain 35 is pulled taut. When the chain 32 has become taut, the clevis 28 and its pin will form a dead-point for the lever 7 and the entire system and the brakes will be operated as before, but with the conditions reversed—that is to say, the brakes which are directly connected with the lever will be applied with a greater pressure, because the power-arm of the lever 8 will now be longer than the power-arm of the lever 7. Furthermore, it will be seen that the difference in pressure and braking effort thus produced between the wheels will always be in a fixed ratio. If it be assumed, as will be the case when two brake-applying devices are employed, that that brake-applying device which is operated is the one which is located at the leading end of the car, it will be seen that by the construction described the brakes will always be applied at the leading end of the car with greater force than at the other end and that consequently the braking effort produced at the leading end of the car will be greater than the braking effort produced at the other end.

It is to be understood that the invention may be embodied in constructions which differ widely from the one which has hereinbefore been described, and this is particularly true where other forms of brake-applying devices—such, for instance, as devices depending upon the action of fluid-pressure—are employed. The invention is not, therefore, to be confined to the specific details of construction hereinabove set forth.

What is claimed is—

1. The combination with a vehicle having wheels at each end and adapted to run in either direction, of brakes coöperating with said wheels, brake-applying devices, and automatic means whereby said devices apply the brakes to produce a greater braking effort at the leading end of the vehicle when it is moving in either direction, the ratio between the braking efforts being constant, substantially as described.

2. The combination with a vehicle having wheels at each end, of brakes coöperating with said wheels, a brake-applying device at each end of the car, and automatic means whereby either applying device applies the brakes to the wheels at both ends of the car and produces the greater braking effort at that end of the car at which the applying device is operated, the ratio between the braking efforts being constant, substantially as described.

3. The combination with a vehicle having wheels at each end thereof and adapted to run in either direction, of brakes coöperating with said wheels, a brake-applying device, a lever system to which said applying device is connected, and automatic means whereby said lever system applies the brakes to produce a greater braking effort at the leading end of the vehicle when it is moving in either direction, the ratio between the braking efforts being constant, substantially as described.

4. The combination with a vehicle having wheels at each end thereof, of brakes coöperating therewith, a plurality of brake-applying devices, a lever system with which said applying devices are connected, and automatic means whereby the lever system applies the brakes with a changing leverage to produce a greater braking effort at that end of the car at which a device is operated, the ratio between the braking efforts being constant, substantially as described.

5. The combination with a vehicle having wheels at each end thereof, of brakes coöperating therewith, a plurality of brake-applying devices, a lever system intermediate the applying devices and the brakes, and automatic means for changing the leverage exerted by the system on the brakes at each end of the vehicle to cause one or the other of the brakes to be applied with greater pressure as one or the other of said applying devices is operated, the ratio between the braking pressures being constant, substantially as described.

6. The combination with a vehicle having wheels at each end, of brakes coöperating with said wheels, a lever system, a brake-applying means, connections between the lever system and the brake-applying means, connections between the lever system and the brakes at each end of the car, and automatic means for varying the leverage so that the system may apply the brakes with greater force at either end of the car, the ratio between the forces being constant, substantially as described.

7. The combination with a vehicle having wheels at each end thereof, of brakes coöperating therewith, a brake-applying device at each end of the vehicle, a lever system intermediate said applying devices and the brakes, and automatic means for changing the leverage exerted by the system on the brakes at each end of the vehicle to cause the brakes at the leading end of the vehicle to be applied with greater pressure than the other brakes when the applying device at the leading end of the vehicle is operated, the ratio between the braking pressures being constant, substantially as described.

8. The combination with a vehicle having a truck at each end, each of said trucks having a plurality of pairs of wheels, of brakes coöperating with said wheels, a brake-applying device, and means whereby said device applies the brakes to the wheels of the trucks so as to produce a greater braking effort at the leading end of the vehicle, the ratio between the braking efforts of the wheels of the two trucks being constant, substantially as described.

9. The combination with a vehicle having a truck at each end, each of said trucks having a plurality of pairs of wheels and adapted to run in either direction, of brakes coöperating with said wheels, brake-applying devices, and means whereby said devices apply the brakes to the wheels of the truck so as to produce a greater braking effort at the leading end of the vehicle when it is moving in either direction, the ratio between the braking efforts being constant, substantially as described.

10. The combination with a vehicle having a truck at each end, each of said trucks having a plurality of pairs of wheels, of brakes coöperating with said wheels, a brake-applying device at each end of the vehicle, and means whereby either applying device applies the brakes to the wheels of the trucks at both ends of the vehicle and produces the greater braking effort of the wheels of the truck at that end of the vehicle at which the applying device is operated, the ratio between the braking efforts of the wheels of the two trucks being constant, substantially as described.

11. The combination with a vehicle having a truck at each end, each of said trucks having a plurality of pairs of wheels, of brakes coöperating with said wheels, a brake-applying device, a lever system to which said brake-applying device is connected, and means whereby the system applies the brakes to the wheels of the trucks to produce a greater braking effort at the leading end of the vehicle when it is moving in either direction, the ratio between the braking efforts being constant, substantially as described.

12. The combination with a vehicle having a truck at each end, each of said trucks having a plurality of pairs of wheels, of brakes coöperating with said wheels, a plurality of brake-applying devices, a lever system with which said devices are connected, and means whereby the lever system applies the brakes with a changing leverage to produce a greater braking effort of the wheels of the truck at that end of the car at which a brake-applying device is operated, the ratio between the braking efforts being constant, substantially as described.

13. The combination with a vehicle having a truck at each end, each of said trucks having a plurality of pairs of wheels, brakes coöperating with said wheels, a plurality of brake-applying devices, a lever system intermediate the applying devices and the brakes, and means for changing the leverage exerted by the system on the brakes at each end of the vehicle to cause the brakes at one end or the other of the vehicle to be applied with greater pressure as one or the other of said applying devices is operated, the ratio between the braking pressures being constant, substantially as described.

14. The combination with a vehicle having a truck at each end, each of said trucks having a plurality of pairs of wheels, of brakes coöperating with said wheels, a lever system, a brake-applying means, connections between the lever system and the brake-applying means, connections between the lever system and the brakes of the wheels of the trucks at each end of the vehicle, and means for varying the leverage so that the system may apply the brakes with greater pressure at either end of the vehicle, the ratio between the pressures being constant, substantially as described.

15. The combination with a vehicle having a truck at each end, each of said trucks having a plurality of pairs of wheels, of brakes coöperating therewith, a brake-applying device at each end of the vehicle, a lever system intermediate said applying devices and the brakes, and means for changing the leverage exerted by the system on the brakes of the wheels of the trucks at each end of the vehicle to cause the brakes at the leading end of the vehicle to be applied with greater pressure than the other brakes when the applying device at the leading end of the vehicle is operated, the ratio between the braking pressures being constant, substantially as described.

16. The combination with a vehicle having wheels at each end, of brakes coöperating with said wheels, a lever system having a plurality of dead-points a part of which may be inoperative when the system is in operation, said dead-points when in operation causing different amounts of pressure in a constant ratio to be applied by the lever system to the brakes at each end of the car, a brake-applying device at each end of the vehicle, and means for throwing into operation one or the other of said dead-points in order to produce different amounts of pressure on the brakes at different ends of the vehicle, substantially as described.

17. The combination with a vehicle having wheels at each end, of brakes coöperating with said wheels, a pair of levers each of said levers having a dead-point, connections from each lever to the brakes at one end of the vehicle, a connection between the two levers, a brake-applying means, connections whereby either lever may be directly operated with a constant leverage by the brake-applying means, and means whereby the dead-point of the lever which is operated through the connection between the levers is thrown into operation whenever the other lever is operated by the brake-applying means, substantially as described.

18. The combination with a vehicle having wheels at each end thereof, of brakes coöperating with said wheels, a pair of levers each of said levers having a dead-point, connections from each lever to the brakes at one end of the vehicle, a connection between the two levers, a brake-applying device at each end of the vehicle, connections from each brake-applying device to one of the levers whereby either lever may be operated with a constant leverage directly from a brake-applying device or through the connections between the levers, and means for causing the dead-point of the lever which is operated through the connections between the levers to become operative when the other lever is operated by the brake-applying device, substantially as described.

19. The combination with a vehicle having wheels at each end, of brakes coöperating with said wheels, a lever system having a plurality of adjustable dead-points, a part of which may be in operation when the system is in operation said dead-points when in operation causing different pressures to be applied by the lever system to the brakes at each end of the vehicle, a brake-applying device at each end of the vehicle, and automatic means for throwing into operation one or the other of said dead-points to produce different amounts of pressure on the brakes at each end of the vehicle, substantially as described.

20. The combination with a vehicle having wheels at each end, of brakes coöperating with said wheels, a lever system having a plurality of adjustable dead-points, a part of which may be in operation when the system is in operation said dead-points when in operation causing different pressures in a constant ratio to be applied by the lever system to the brakes at each end of the vehicle, a brake-applying device at each end of the vehicle, and automatic means for throwing into operation one or the other of said dead-points to produce different amounts of pressure on the brakes at each end of the vehicle, substantially as described.

21. The combination with a vehicle having a truck at each end, each of said trucks having a plurality of pairs of wheels, of brakes coöperating with said wheels, a lever system having a plurality of adjustable dead-points a part of which may be in operation when the system is in operation, said dead-points when in operation causing different pressures to be applied by the lever system to the brakes at each end of the vehicle, a brake-applying device at each end of the vehicle, and means for throwing into operation one or the other of said dead-points to produce different amounts of pressure on the brakes at each end of the vehicle, substantially as described.

22. The combination with a vehicle having a truck at each end, each of said trucks having a plurality of pairs of wheels, of brakes coöperating with said wheels, a lever system having a plurality of adjustable dead-points, a part of which may be in operation when the system is in operation, said dead-points when in operation causing different pressures in a constant ratio to be applied by the lever system to the brakes at each end of the vehicle, a brake-applying device at each end of the vehicle, and means for throwing into operation one or the other of said dead-points to produce different amounts of pressure on the brakes at each end of the vehicle, substantially as described.

23. The combination with a vehicle having wheels at each end thereof, of brakes coöperating with said wheels, a pair of levers each of said levers having an adjustable dead-point, connections from each lever to the brakes at one end of the vehicle, a connection between the two levers, a brake-applying device at each end of the vehicle, connections from each brake-applying device to one of the levers whereby either lever may be operated directly from a brake-applying device or through the connections between the levers, and means for causing the dead-point of the lever which is operated through the connections between the levers to become operative when the other lever is operated by its brake-applying device, substantially as described.

24. The combination with a vehicle having wheels at each end thereof, of brakes coöperating with said wheels, a pair of levers each of said levers having an adjustable dead-point, connections from each lever to the brakes at one end of the vehicle, a connection between the two levers, a brake-applying device at each end of the vehicle, connections from each brake-applying device to one of the levers whereby either lever may be operated with a constant leverage directly from a brake-applying device or through the connections between the levers, and means for causing the dead-point of the lever which is operated through the connections between the levers to become operative when the other lever is operated by its brake-applying device, substantially as described.

25. The combination with a vehicle having wheels at each end thereof, of brakes coöperating with said wheels, a pair of levers each of said levers having a dead-point, connections from each lever to the brakes at one end of the vehicle, a connection between the two levers, a brake-applying device at each end of the vehicle, adjustable connections from each brake-applying device to one of the levers whereby either lever may be operated directly from a brake-applying device or through the connections between the levers, and means for causing the dead-point of the lever which is operated through the connections between the levers to become operative when the other lever is operated by its brake-applying device, substantially as described.

26. The combination with a vehicle having wheels at each end thereof, of brakes coöperating with said wheels, a pair of levers each of said levers having a dead-point, connections from each lever to the brakes at one end of the vehicle, a connection between the two levers, a brake-applying device at each end of the vehicle, adjustable connections from each brake-applying device to one of the levers whereby each lever may be operated with a constant leverage directly from a brake-applying device or through the connections between the levers, and means for causing the dead-point of the lever which is operated through the connections between the levers to become operative when the other lever is operated by its brake-applying device, substantially as described.

27. The combination with a vehicle having wheels at each end thereof, of brakes coöperating with said wheels, a pair of levers each of said levers having an adjustable dead-point, connections from each lever to the brakes at one end of the vehicle, a connection between the two levers, a brake-applying device at each end of the vehicle, adjustable connections from each brake-applying device to one of the levers whereby each lever may be operated directly from a brake-applying device or through the connections between the levers, and means for causing the dead-point of the lever which is operated through the connections between the levers to become operative when the other lever is operated by its brake-applying device, substantially as described.

28. The combination with a vehicle having wheels at each end thereof, of brakes coöperating with said wheels, a pair of levers each of said levers having an adjustable dead-point, connections from each lever to the brakes at one end of the vehicle, a connection between the two levers, a brake-applying device at each end of the vehicle, adjustable connections from each brake-applying device to one of the levers whereby each lever may be operated with a constant leverage directly from a brake-applying device or through the connections between the levers, and means for causing the dead-point of the lever which is operated through the connections between the levers to become operative when the other lever is operated by its brake-applying device, substantially as described.

29. The combination with a vehicle having wheels at each end thereof, of brakes coöperating with said wheels, a pair of floating levers, connections between the two levers, connections between the levers and the brakes, a stop for each of the levers, said stop constituting a dead-point and being arranged to be operated when the lever is moved in one direction only, and means for operating the levers, substantially as described.

30. The combination with a vehicle having wheels at each end thereof, of brakes coöperating with said wheels, a pair of floating levers, connections between the two levers, connections between the levers and the brakes, an adjustable stop for each of the levers, said stop constituting a dead-point and being arranged to be operated when the lever is moved in one direction only, and means for operating the levers, substantially as described.

31. The combination with a vehicle having wheels at each end thereof, of brakes coöperating with said wheels, a pair of floating levers, connections between the two levers, connections between the levers and the brakes, a stop for each of the levers, said stop constituting a dead-point and being arranged to be operated when the lever is moved in one direction only, a brake-applying device at each end of the vehicle, and connections between each of said devices and one of the levers, substantially as described.

32. The combination with a vehicle having wheels at each end thereof, of brakes coöperating with said wheels, a pair of floating levers, connections between the two levers, connections between the levers and the brakes, a stop for each of the levers said stops constituting dead-points, flexible connections between the stops and the frame of the vehicle, and means for operating the levers, substantially as described.

33. The combination with a vehicle having wheels at each end thereof, of brakes coöperating with said wheels, a pair of floating levers, connections between the two levers, connections between the levers and the brakes, a stop for each of the levers said stops constituting dead-points, flexible connections between the stops and the frame of the vehicle, a brake-applying device at each end of the vehicle, and connections between each of said devices and one of the levers, substantially as described.

34. The combination with a vehicle having wheels at each end, of brakes coöperating with the wheels, a pair of floating levers, connections from the inner end of each lever to the brakes at one end of the vehicle, a pair of brake-applying devices, connections between the outer end of said levers and the brake-applying devices, a connection between the two levers, and a stop for each lever constituting a dead-point, said stop being located between the connection to the applying device and the connection to the brakes and being operative only when the lever is operated by the connection between the two levers, substantially as described.

35. The combination with a vehicle having wheels at each end, of brakes coöperating with the wheels, a pair of floating levers, connections from the inner end of each lever to the brakes at one end of the vehicle, a pair of brake-applying devices, connections between the outer end of said levers and the brake-applying devices, a connection between the two levers, and an adjustable stop for each lever constituting a dead-point, said stop being located between the connection to the applying device and the connection to the brakes and being operative only when the lever is operated by the connection between the two levers, substantially as described.

36. The combination with a vehicle having wheels at each end, of brakes coöperating with the wheels, a pair of floating levers, connections from the inner end of each lever to the brakes at one end of the vehicle, a brake-applying device at each end of the vehicle, connections between the outer end of each lever and a brake-applying device, a connection between the two levers, and a stop for each lever constituting a dead-point, said stop being located between the connection to the applying device and the connection to the brakes and being operative only when the lever is operated by the connection between the two levers, substantially as described.

37. The combination with a vehicle having wheels at each end, of brakes coöperating with the wheels, a pair of floating levers, connections from the inner end of each lever to the brakes at one end of the vehicle, a brake-applying device at each end of the vehicle, connections between the outer end of each lever and a brake-applying device, a connection between the two levers, and an adjustable stop for each lever constituting a dead-point, said stop being located between the connection to the applying device and the connection to the brakes and being operative only when the lever is operated by the connection between the two levers, substantially as described.

In testimony whereof I have hereunto set my hand in the presence of two subscribing witnesses.

JOHN D. KEILEY.

Witnesses:
G. W. BORST,
J. A. GRAVES.